UNITED STATES PATENT OFFICE.

CALEB G. COLLINS, OF WOODSBURG, NEW YORK, ASSIGNOR TO CALVIN AMORY STEVENS, OF NEW YORK, N. Y.

PROCESS OF EXTRACTING METALS FROM THEIR ORES.

SPECIFICATION forming part of Letters Patent No. 648,354, dated April 24, 1900.

Application filed September 8, 1898. Serial No. 690,466. (No specimens.)

*To all whom it may concern:*

Be it known that I, CALEB G. COLLINS, a citizen of the United States, residing at Woodsburg, in the county of Queens and State of New York, have invented certain new and useful Improvements in Processes of Extracting Metals from Their Ores, of which the following is a specification sufficient to enable others skilled in the art to which the invention appertains to make and use the same.

The object of this invention is to provide a simple and economical method of treating natural carbonates, hydrates, chlorids, and sulfids of the metals, particularly those of copper, silver, nickel, and cobalt, in such manner as to obtain the compounds of these metals in a highly-concentrated form for subsequent treatment in any of the well-known ways suited to the particular compound or metal to be reduced to the metallic state.

Primarily my invention consists in placing powdered ore in a solution of an ammonium salt and then decomposing the ammonium salt in the presence of ore by the addition to the solution of a powerful alkali.

It also consists in treating unusually-refractory ores by the addition to the solution of a hypochlorite of an alkali.

Incidentally the invention includes the precipitation of the metal by the addition of an alkali-metal silicate, as hereinafter set forth.

By way of illustration in the case of carbonates, hydrates, or chlorids of copper or silver or compound hydrates and carbonates of these metals I mix finely-ground ore with a solution of an ammonium salt in water, using for this purpose the sulfate, chlorid, nitrate, or acetate of ammonium, as may be convenient, and in quantity according to the amount of metal in the ore, and then add to the mixture so made enough calcium hydrate, $Ca(OH)_2$, or barium hydrate, $Ba(OH)_2$, or potassium or sodium hydrate previously stirred up with a little water to decompose the ammonium salt in the solution, which ammonium set free from previous combination in immediate presence of the finely-powdered ore attacks the metal compounds in the ore with much more enery than when aqua-ammonia is used, however strong it may be.

For an ore containing, say, three per cent. of copper in the form of melaconite, (CuO,) or in the form of cuprite, ($Cu_2O$,) or in malachite, $CuCo_3 + Cu(OH)_2$, or in the form of azurite, $2CuCO_3 + Cu(OH)_2$, I use for each two thousand pounds of the powdered ore from one hundred and ten to one hundred and thirty pounds of ammonium sulfate previously dissolved in one thousand pounds of water and then add from ninety to one hundred pounds of quicklime previously slacked in four hundred pounds of water, and then give the mixture a most thorough stirring for one hour or less and run the whole through a filter in the usual way or through a continuous centrifugal filter, where the solution is drained off and the precipitate washed before leaving the centrifugal.

The resulting ammonium solution of copper can be treated with sodium pentasulfid for precipitation of the copper as copper sulfid, or the copper can be separated in the metallic state from its solution by electrolysis, the ammonium in both cases being recovered to be used again on fresh ore. When sodium pentasulfid ($Na_2S_5$) or calcium pentasulfid ($CaS_5$) is used as the precipitant of the copper from the ammonium solution, the ammonium is recovered by treating the filtered fluid by distillation. Another economical way to precipitate the copper from an ammonium solution is to treat it with a water solution of sodium tetrasilicate, ($Na_2Si_4O_9$,) by which insoluble copper silicate ($CuSiO_3$) is precipitated and the ammonium set free at once. Thus:

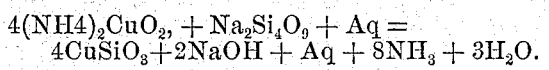

Of course in treating any one of the copper ores before named with an ammonium salt and a fixed alkali the proportions of the ammonium compound and the alkali used must vary not only with the amount of copper in the ore, but with the nature of the ammonium salt and alkali used. Thus for every 63.1 parts of copper in the ore there will be required for its extraction one hundred and thirty-two parts, by weight, of ammonium sulfate and fifty-six parts of quicklime, should ammonium sulfate and quicklime be the forms of ammonium salt and alkali used; but as the ammonium is recovered and used over again almost indefinitely the large quantity indicated does not signify or matter. Should the ammonium salt and alkali used be in the form of ammonium chlorid ($NH_4C_l$) and sodium hydrate, then to each 63.1 parts of copper in the ore there would be required one hundred and seven parts of the ammonium chlorid and eighty parts of caustic soda, weighed before dissolving it, or if ammonium nitrate and caustic baryta were used then to each 63.1 parts of copper in the ore would be required one hundred and sixty parts of ammonium nitrate and 170.8 parts barium hydrate, or if barium is replaced by lime then fifty-six parts of quicklime (CaO) or seventy-four parts of lime hydrate $Ca(OH)_2$ will answer to set the ammonium free from the one hundred and sixty parts of ammonium nitrate, though in some cases or with particular kinds of ores the barium hydrate works better than lime, and as the baryta can easily and cheaply be recovered in the form of barium sulfate, valuable for painting, it makes little difference as to cost whether baryta or lime be used, and as the nitric acid can be easily recovered from the nitrate of ammonium there is not much difference in the ultimate expense whether the nitrate or sulfate of ammonium be employed. Barium hydrate $Ba(OH)$ is a more powerful base than lime, soda, or potash, and where an ore is especially refractory to the dissolving process there is great advantage in using baryta in preference to the other alkalies.

When it comes to treating silver ores like silver carbonate, ($Ag_2CO_3$,) ceragyrite or silver chlorid, ($AgCl$,) much the same treatment is given as with the copper ores before named; but with silver sulfid and copper sulfid the process must be modified, as hereinafter described.

The ore containing silver, as sulfid, is finely powdered, and then to every two hundred and forty-eight parts of silver sulfid ($Ag_2S$) two hundred and eighty-eight parts of lead chlorid ($PbCl_2$) in a state of fine division and one hundred and forty-nine parts of sodium hypochlorite (NaClO) or an equivalent amount of any other soluble hypochlorite, together with half the weight of the ore of water, is added to the ore and the whole stirred together for about an hour or less by means of any suitable mechanism. This operation may be conducted at common temperatures or heat may be applied, which latter condition accelerates the chemical changes which make the silver compounds become soluble. The chemical reactions which take place in the above operation are supposed to be as follows: $2Ag2S + 2PbCl2 + 4NaClO = 4AgCl + PbS2O3 + PbCl2 + Na2O + 2NaCl$, the sodium oxid (Na2O) produced uniting with water as quickly as the oxid is evolved to give an equivalent of sodium hydrate, (2NaOH.) After the mixing of the water, ore, and other ingredients in the way described the whole is allowed to cool in case heat has been used, and then to each two hundred and sixteen parts of actual silver contained in the ore is added one hundred and two parts of strong water of ammonia of 26° strength, or an equivalent amount of ammonium salt, together with sufficient calcium or barium or sodium hydrate to decompose the ammonium salt, is added to the ore mixture, together with an additional amount of water in quantity equal to the weight of the ore, and then the stirring or agitation of the whole mixture is recommenced and continued for about an hour or less, after which the mass is drained of its soluble contents by simple filtering and washing or by means of a centrifugal filter. The solution so obtained will, if the operations have been conducted as described, contain practically all of the silver which was in the ore, and from this ammoniacal solution the silver may be precipitated by electrolysis or by the use of a soluble sulfid or by a soluble silicate, and the ammonium recovered to be used over again and the impure precipitated silver refined by any of the well-known processes.

When it comes to treatment of copper-sulfid ores, the simple addition of a soluble alkaline hypochlorite to the ammonia-water or ammonium salt and calcium, barium, or sodium hydrates used is sufficient to cause the copper sulfid to dissolve at once, though the solvent action is hastened by the addition of a metallic chlorid—such as sodium, magnesium, calcium, or iron chlorids—the mixture of powdered copper ore, ammonia-water, or solution of ammonium salt, strong alkaline hydrate, hypochlorite, and metal chlorid being mixed all together at once and stirred for one hour or less, and then the copper solution so produced filtered off and precipitated and the ammonium recovered, as before described, or the copper-sulfid ore may be treated with the hypochlorite-water or iron chlorid and then afterward with the ammonium. In operating on copper-sulfid ore the ore, finely powdered, requires for its decomposition and solution to each 63.1 parts of copper found to be in the ore thirty-two parts of common bleaching-powder, which is an impure calcium hypochlorite ($CaCl_2O + CaCl_2$) and one hundred and twenty-seven parts of ferrous chlorid, ($FeCl_2$,) the calcium hypochlorite in this reaction appearing to act as either a carrier of chlorin from the iron to the copper or merely acting catalytically or by contact. At any rate the relatively-small amount of hypochlorite required to promote solution of the copper would appear to support this view. The precipitation of the copper and recovery of the ammonium from the solution obtained from the sulfid ore is conducted the same as before described for solution obtained from other ores of copper.

This process can be applied with slight modifications to the treatment of nickel and cobalt ores for the extraction of these metals.

My improved process is economical because all roasting or preliminary treatment of the ore is rendered unnecessary and because the ammonium salts can be recovered. Furthermore, the appliances requisite for carrying out my process are exceedingly simple and inexpensive, since the essentials only involve the reduction of the ore to powder, placing it in a suitable tank, stirring, filtering, and precipitation.

What I claim as my invention, and desire to secure by Letters Patent, is—

1. The process herein set forth of extracting metals from their ores consisting in dissolving out or extracting metal from the powdered ore by means of a solution of ammonium salt in the presence of an alkaline base capable of decomposing the ammonium salt, substantially as described.

2. The process herein set forth of extracting metals from extra-refractory ores consisting in dissolving out or extracting the metal from the powdered ore by means of a solution containing ammonium salt, an alkaline base capable of decomposing the ammonium salt and a hypochlorite of an alkali metal, substantially as described.

3. The process herein set forth of extracting metals from their ores consisting in dissolving out or extracting the metal from the powdered ore by means of a solution of ammonium salt in the presence of an alkali base capable of decomposing the ammonium salt, and then precipitating the metal by the addition of a solution of an alkali metal, substantially as described.

CALEB G. COLLINS.

Witnesses:
D. W. GARDNER,
GEO. WM. MIATT.